United States Patent
Green et al.

(10) Patent No.: US 10,766,800 B2
(45) Date of Patent: Sep. 8, 2020

(54) REMOVAL OF NITRATES FROM GROUND WATER

(71) Applicant: TECHNION RESEARCH & DEVELOPMENT FOUNDATION LIMITED, Haifa (IL)

(72) Inventors: Michal Green, Haifa (IL); Ori Lahav, Givat Ela (IL); Razi Epsztein, Kfar Tavor (IL); Oded Nir, Haifa (IL)

(73) Assignee: TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 68 days.

(21) Appl. No.: 15/571,162

(22) PCT Filed: May 3, 2016

(86) PCT No.: PCT/IL2016/050457
§ 371 (c)(1),
(2) Date: Nov. 1, 2017

(87) PCT Pub. No.: WO2016/178216
PCT Pub. Date: Nov. 10, 2016

(65) Prior Publication Data
US 2018/0257964 A1    Sep. 13, 2018

(30) Foreign Application Priority Data
May 5, 2015   (IL) .......................................... 238644

(51) Int. Cl.
*B01D 61/02* (2006.01)
*C02F 1/44* (2006.01)
(Continued)

(52) U.S. Cl.
CPC .............. *C02F 9/00* (2013.01); *B01D 61/022* (2013.01); *C02F 1/441* (2013.01); *C02F 1/442* (2013.01);
(Continued)

(58) Field of Classification Search
None
See application file for complete search history.

(56) References Cited

U.S. PATENT DOCUMENTS 5,460,723 A    10/1995 Bourbigot
2007/0080113 A1*  4/2007 Vuong ................. B01D 61/022
                                                        210/650

(Continued)

FOREIGN PATENT DOCUMENTS

DE    102011077500 A1    12/2012
WO    2007138327 A1    12/2007
(Continued)

OTHER PUBLICATIONS

DE 102011077500 Machine Translation—Eumann, Michael—Dec. 20, 2012 (Year: 2012).*
(Continued)

*Primary Examiner* — Bradley R Spies
(74) *Attorney, Agent, or Firm* — Rothwell, Figg, Ernst & Manbeck, P.C.

(57) ABSTRACT

The present invention relates to a process for the selective removal of nitrates from ground water using a hybrid nanofiltration (NF)—reverse osmosis (RO) filtration system. The process generates product water that is low in nitrate and can be used for drinking, irrigation and other purposes, as well as waste water that is relatively low in salinity and can be safely discarded to sewage systems and recycled, e.g., for irrigation purposes.

12 Claims, 11 Drawing Sheets

(51) Int. Cl.
    *C02F 101/16*     (2006.01)
    *C02F 103/06*     (2006.01)
    *C02F 9/00*     (2006.01)

(52) U.S. Cl.
    CPC .......... *B01D 61/025* (2013.01); *B01D 61/027* (2013.01); *B01D 2315/10* (2013.01); *B01D 2317/025* (2013.01); *C02F 2101/163* (2013.01); *C02F 2103/06* (2013.01); *C02F 2301/043* (2013.01); *C02F 2301/08* (2013.01)

(56) References Cited

U.S. PATENT DOCUMENTS

| | | |
|---|---|---|
| 2010/0163471 A1 | 7/2010 | Elyanow |
| 2013/0020259 A1 | 1/2013 | Wallace |
| 2014/0224734 A1 | 8/2014 | Abd Ellatif |

FOREIGN PATENT DOCUMENTS

| | | |
|---|---|---|
| WO | 2010122336 A2 | 10/2010 |
| WO | 2012019274 A1 | 2/2012 |

OTHER PUBLICATIONS

Weber, B. et al—"Salt reduction in municipal sewage allocated for reuse: the outcome of a new policy in Israel"—Water Science and Technology vol. 50 No. 2 pp. 17-22, 2004 (Year: 2004).*

Amouha et al., (2011) Nanofiltration efficiency in nitrate removal from groundwater: a semi-industrial case study, In International Conference on Environmental Engineering and Applications (ICEEA), Shanghai, China, 232-236.

Bohdziewicz et al., (1999) The application of reverse osmosis and nanofiltration to the removal of nitrates from groundwater, Desalination, 121(2), 139-147.

Garcia et al., (2006) Nitrate ions elimination from drinking water by nanofiltration: membrane choice, Separation and purification technology, 52(1), 196-200.

Green et al., (1994) Groundwater denitrification using an upflow sludge blanket reactor, Water Research, 28(3), 631-637.

Häyrynen et al., (2009) Concentration of ammonium and nitrate from mine water by reverse osmosis and nanofiltration, Desalination, 240(1-3), 280-289.

Kéba Diawara et al., (2005) Influence of chloride, nitrate, and sulphate on the removal of fluoride ions by using nanofiltration membranes, Separation science and technology, 40(16), 3339-3347.

Matějů et al., (1992) Biological water denitrification—a review, Enzyme and Microbial Technology, 14(3), 170-183.

Mulder, (1996) Module and process design, In Basic Principles of Membrane Technology, 465-520.

Rautenbach & Gröschl, (1990) Separation potential of nanofiltration membranes, Desalination, 77, 73-84.

Richards et al., (2010) Impact of pH on the removal of fluoride, nitrate and boron by nanofiltration/reverse osmosis, Desalination, 261(3), 331-337.

Rivett et al., (2008) Nitrate attenuation in groundwater: a review of biogeochemical controlling processes, Water research, 42(16), 4215-4232.

Santafé-Moros et al., (2005) Performance of commercial nanofiltration membranes in the removal of nitrate ions, Desalination, 185(1-3), 281-287.

Santafé-Moros et al., (2007) Nitrate removal from ternary ionic solutions by a tight nanofiltration membrane, Desalination, 204(1-3), 63-71.

Van Der Bruggen & Geens, (2008) Nanofiltration, in Advanced Membrane Technology and Applications, 271-295.

Van der Bruggen & Vandecasteele, (2003) Removal of pollutants from surface water and groundwater by nanofiltration: overview of possible applications in the drinking water industry, Environmental pollution, 122(3), 435-445.

Wang et al., (2005) Separation performance of a nanofiltration membrane influenced by species and concentration of ions. Desalination, 175(2), 219-225.

Molinari et al., (2001) Studies on interactions between membranes (RO and NF) and pollutants (SiO2, NO3−, Mn++ and humic acid) in water, Desalination 138(1-3): 271-281.

* cited by examiner

REMOVAL OF NITRATES FROM GROUND WATER

CROSS REFERENCE TO RELATED APPLICATION

This application is a 35 U.S.C. 371 National Phase Entry Application from PCT/IL2016/050457, filed May 3, 2016, which claims the benefit of Israeli Patent Application No. 238644 filed on May 5, 2015, the disclosures of which are incorporated herein in their entirety by reference.

FIELD OF THE INVENTION

The present invention relates to a process for the selective removal of nitrates from ground water using a hybrid nanofiltration-reverse osmosis filtration system. The process generates product water that is low in nitrate and that can be used for drinking, irrigation and other purposes, as well as waste water that is low in brine and can be safely discarded to sewage systems.

BACKGROUND OF THE INVENTION

Increase in nitrate concentrations is observed in ground waters around the globe, mostly resulting from intensive application of fertilizers. Excessive nitrate concentration is the main reason for closure of wells in the coastal aquifer, resulting in loss of substantial amounts of water. For example, in Israel, nitrate concentrations exceeding the 70 mg/L (~16 mg $NO_3^-$—N/L) standard results in an annual water loss of ~24 million $m^3$. Application of advanced treatment technologies is required to reduce nitrate concentrations from 90-120 or higher to below 60 mg/L in a cost effective and efficient fashion.

Advanced physical-chemical treatment techniques such as reverse osmosis (RO), ion exchange and electrodialysis are known to be effective for removing nitrates. However, all three methods produce waste concentrates (brines) containing high concentrations of nitrate, as well as other ions. Brine disposal is regulated all over the world, mainly because chloride ($Cl^-$) can have negative effects on ecosystems, for example on freshwater organisms, plants and groundwater. In many inland places, local regulations regarding discharge of brines to the sewage system limit the application of physical-chemical technologies. For example, in Israel, because of agricultural concerns associated with irrigation with reclaimed water, chloride concentration in brine disposal is stringently regulated. The threshold sodium ($Na^+$) and chloride ($Cl^-$) concentrations for disposal to the sewage are 230 and 430 mg/L, respectively. In the United States, chloride ($Cl^-$) limitations in general NPDES (National Pollutant Discharge Elimination System) permits vary between 250 to 1,000 mg/l (e.g., Illinois Louisiana, Mo.), while individual NPDES permits can be much more stringent (e.g., 150 mg/l in California and Florida). In addition, NPDES permits for membrane desalination and ion exchange plants may also require limits of chloride loadings (on top of concentration limitation). (Drinking Water Treatment Plant Residuals Management Technical Report. Summary of Residuals Generation, Treatment, and Disposal at Large Community Water Systems. September 2011. EPA 820-R-11-003).

Treatment facilities installed for $NO_3^-$ removal from drinking water are mainly based on separation by electrodialysis and RO. On top of brine production, another drawback of membrane technologies is the potential for chemical fouling of the membrane. To minimize chemical fouling, operation with low water recovery ratios or the use of chemicals (antiscalants) is practiced. Biological denitrification, the alternative treatment method, does not produce waste brine but requires an intensive post-treatment step to remove potential water contamination by organic matter and bacteria. Moreover, health concerns and public acceptance constraints limit the application of biological treatment of drinking water [1-3].

Nanofiltration (NF) is a promising technology which has been reported suitable for groundwater treatment. It is defined as a process with characteristics between RO and ultrafiltration and comprises a variety of membrane types with different retention efficiencies for either mono- and multivalent ions [4]. The main advantage of NF over RO is operation under lower pressures and higher recoveries [5]. The use of NF technology was extensively reported for water treatment processes as a sole treatment stage [4-10] or in combination with RO [11-13,16]. Rauternbach and Groschl suggested a scheme for nitrate removal based on RO with the addition of $NF+Na_2SO_4$ to achieve high water recovery ratio [16]. However, with respect to $NO_3^-$ removal all of these processes, in their current development stage, are still limited by the aforementioned drawback associated with production of concentrated brines and the accompanied disposal issue.

There is an unmet need for economical and reliable techniques for removal of nitrate from water, which process generates waste water sufficiently low in brine to enable disposal into local sewage systems.

SUMMARY OF THE INVENTION

The present invention provides a novel filtration system and method for removal of nitrate from groundwater, characterized by production of low salinity waste brine that can be easily discharged to sewerage systems and high product-water recovery. The inherent preference of particular NF membranes for rejecting chloride and sodium over nitrate ions [14] is utilized in a preliminary NF stage to remove $Na^+$, $Cl^-$, $Ca^{2+}$ and $Mg^{2+}$ to a side stream. In a second stage, RO is applied to remove $NO_3^-$. The RO permeate is mixed with the side stream of the NF stage to create product water low in nitrate, yet with a balanced composition comprising all the required species and minerals, that is suitable for a variety of purposes such as drinking or irrigation. As a result of this process, the salinity of the resulting waste brine is relatively low and can be discharged to the sewage according to local regulations. Moreover, the nitrate-rich brine contains relatively low $Na^+$ and $Cl^-$ concentrations and can thus be used for a variety of applications, including irrigation purposes. The various alternatives for process design such as the NF membrane type, the number of NF stages and the recovery ratio of each filtration stage depend mainly on the planned usage of the waste brine and on the local regulations for both brine and product water. These aspects, along with other considerations related to the proposed process are exemplified herein on a specific nitrate-contaminated groundwater and brine discharge according to local Israeli regulations. Based on Israeli regulations for both drinking water and required composition of brines discharged to the sewage, a treatment scheme composed of a single- and double NF stages followed by RO is described herein to reach water recoveries of 91.4% and 94.3%, respectively. However, the principles of the present invention are described in a manner enabling the suggested treatment scheme to be easily adjusted to other discharge criteria and/or water characteristics.

Every physico-chemical treatment plant requires a permit for brine removal. The regulations are country and site-specific. However, in all cases, the solutions known to date are costly especially for inland applications. Such solutions include evaporation ponds or fields, brine lines to the sea or to surface water, etc. In all cases the costs strongly depend on salts load (flow*concentration). The present invention provides for the first time a unique solution to a wide range of requirements regarding brine concentration, brine volume and brine load.

Advantages of the combined NF/RO scheme according to the principles of the present invention include less water treated by the RO, significant increase in total recovery ratio, no need in re-mineralization of the product water and minimization of calcium carbonate precipitation potential on the RO membrane.

According to a first aspect, the present invention provides a process for removal of nitrates from water, the process comprising the steps of:
a. passing a sample of water through a nanofiltration (NF) membrane to obtain a NF permeate and a NF retentate;
b. passing the NF permeate obtained in step (a) through a reverse osmosis (RO) membrane to obtain an RO permeate and an RO retentate;
c. combining the NF retentate obtained in step (a) with the RO permeate obtained in step (b) so as to produce product water; and
d. discarding the RO retentate obtained in step (b);
wherein the RO retentate comprises brine having a sodium ($Na^+$) concentration below about 250 mg/L and a chloride ($Cl^-$) concentration below about 450 mg/L.

The aforementioned process is illustrated schematically in FIG. 1.

In some embodiments, the process includes the use of more than one NF membrane, prior to the RO membrane stage, so as to increase the efficiency of the process. Thus, in some embodiments, the process further comprises the step of passing the NF permeate obtained in step (a) through at least one additional NF membrane prior to performing step (b). This embodiment, using two NF membranes, is illustrated schematically in FIG. 2. In accordance with this embodiment, the NF retentates resulting from each NF step are combined, and then the combined NF retentates are mixed with the RO permeate. Thus, in some embodiments, the process comprises the steps of:
a. passing a sample of water through a first NF membrane to obtain a first NF permeate and a first NF retentate;
b. passing the first NF permeate obtained in step (a) through a second NF membrane to obtain a second NF permeate and a second NF retentate;
c. combining the first and second NF retentates;
d. passing the second NF permeate obtained in step (b) through an RO membrane to obtain an RO permeate and an RO retentate;
e. combining the combined NF retentate obtained in step (c) with the RO permeate obtained in step (d) so as to produce product water; and
f. discarding the RO retentate obtained step (d);
wherein the RO retentate comprises brine having a sodium ($Na^+$) concentration below about 250 mg/L and a chloride ($Cl^-$) concentration below about 450 mg/L.

In some embodiments, the NF membrane preferentially rejects $Na^+$, $Cl^-$, $Ca^{+2}$ and/or $Mg^{2+}$ ions over $NO_3^-$ ions.

Any NF membrane known to a person of skill in the art can be used in the process of the invention. In some embodiments, the NF membrane is selected from the group consisting of DL, DK, NF90, NF245, NF270 and TS80, or any other suitable NF membrane.

In some embodiments, the NF membrane rejects divalent ions selected from $Ca^{+2}$ and $Mg^{+2}$ thereby preventing precipitation of said ions in the RO stage.

According to the principles of the present invention, the RO permeate is mixed with the side stream of the NF stage to create product water low in nitrate, yet with a balanced composition comprising all the required species and minerals, that is suitable for a variety of purposes such as drinking or irrigation. In one embodiment, the product water in step (c) has a nitrate concentration below about 16.0 mgN/l, more preferably below about 13.5 mgN/l, which corresponds to the maximum allowed nitrate according to Israeli regulations.

Furthermore, as explained above, the NF stage removes salts that are later returned to the RO permeate, and in this way the salinity of the resulting waste water (i.e., the RO retentate) is relatively low such that it be discharged to the sewage according to local regulations. This is a significant advantage over the prior art processes, none of which realize the problem of keeping the brine concentration in the RO retentate sufficiently low so as to enable discharge into sewage. Thus, in some embodiments, the RO retentate resulting from the process of the invention comprises brine having a sodium ($Na^+$) concentration below about 250 mg/L and a chloride ($Cl^-$) concentration below about 450 mg/L. In currently preferred embodiments, the brine has a sodium ($Na^+$) concentration below about 230 mg/L and a chloride ($Cl^-$) concentration below about 430 mg/L.

According to some embodiments, the process does not involve the additional additives to the source water prior to the treatment with the NF/RO schemes described herein.

In other embodiments, the present invention provides a system for removal of nitrates from water, the system comprising:
a. at least one nanofiltration (NF) module, each comprising a NF membrane, an inlet for a feed stream, an outlet for a NF permeate stream and an outlet for a NF retentate stream;
b. a reverse osmosis (RO) module comprising a RO membrane through which the NF permeate stream passes, an outlet for an RO permeate stream and an outlet for a RO retentate stream;
c. a connector connecting the NF retentate stream and the RO permeate stream;
wherein the system is adapted to produce product water comprising the NF retentate and RO permeate, and an RO retentate comprising brine having a sodium ($Na^+$) concentration below about 250 mg/L and a chloride ($Cl^-$) concentration below about 450 mg/L. In currently preferred embodiments, the brine has a sodium ($Na^+$) concentration below about 230 mg/L and a chloride ($Cl^-$) concentration below about 430 mg/L.

As contemplated herein, the selection of the recovery ratio to be applied in each filtration stage is important for successful process design. Thus, recovery ratios of the NF and RO stages may be adjusted to meet local standards as desired, which saves energy and minimizes costs. Therefore, optimal recovery ratios in both the NF (first stage NF in the double NF scheme) and RO steps should be pre-determined in order to meet regulations of both product water and waste brine to be discharged to the sewage. In one embodiment, the NF minimal recovery ratio is about 70% and the RO minimal recovery ratio is about 90%. However, it is apparent to a person of skill in the art that optimal recovery ratios will be determined in each case based on the nature of the source water, the desired use of the product water, the nature of the NF and RO membranes, and any regulatory limitation on the waste water that will be discharged to sewage systems.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1:
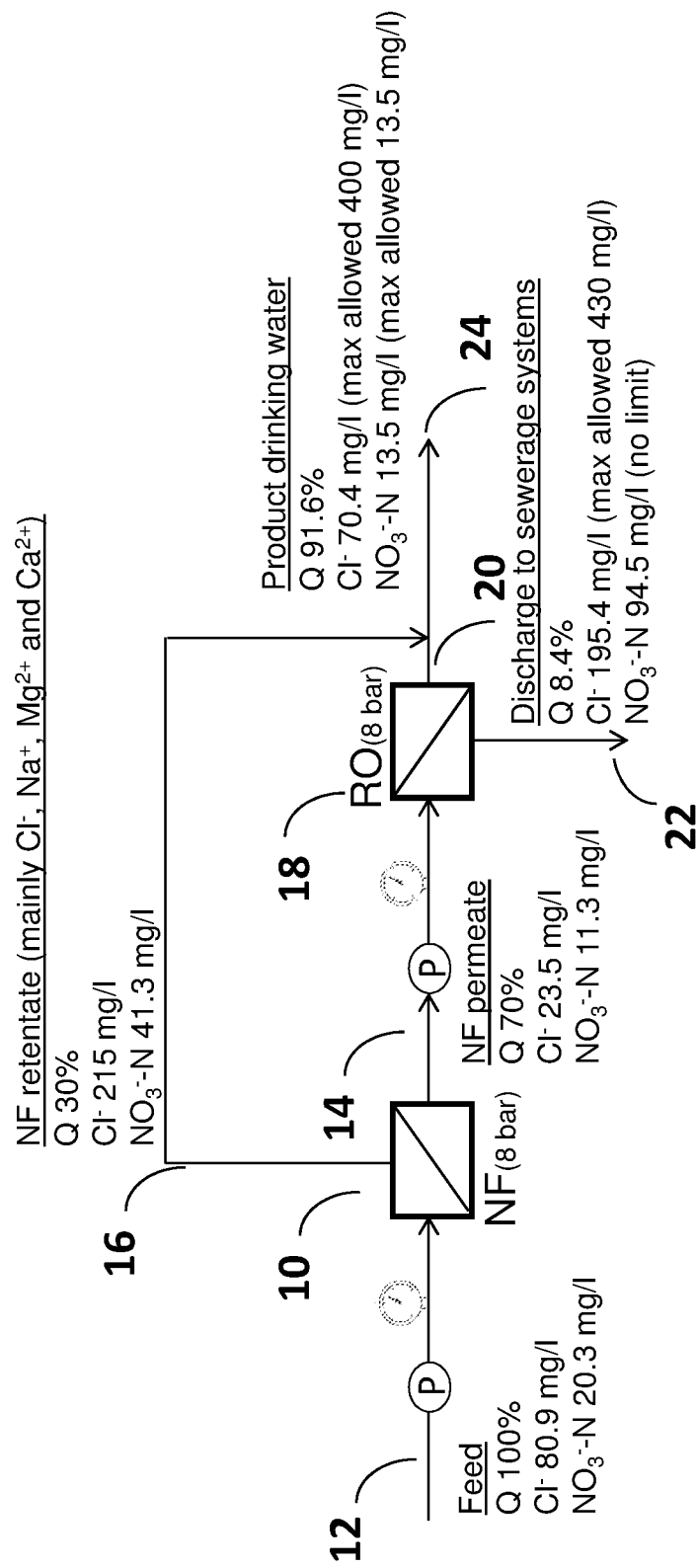
FIG. 1: is a schematic representation of a treatment scheme according to the present invention using a single NF stage.

The present invention relates to a process for the selective removal of nitrates from ground water using a hybrid nanofiltration-reverse osmosis filtration system. The combined system comprises a NF step followed by RO filtration. The NF step can be applied in single-, double- or multi-stage modes, according to the removal efficiency of the NF membrane, as discussed hereinbelow.

The NF stage serves as a selective barrier for passage of nitrate to the permeate water over the passage of other monovalent ions (e.g. chloride and sodium). It also rejects $Ca^{2+}$, $SO_4^{2-}$ and $HCO_3^-$ ions to a large extent thereby reducing the precipitation and scaling potential of (mainly) calcium-based precipitants in the following RO stage. Additionally, it reduces the amount of water needed to be treated by RO. In the RO step, nitrate and the remaining ions are rejected and removed as brine with relatively low salinity. The concentrated stream from the NF step is mixed with the product water emerging from the RO step (i.e. RO permeate), thus re-mineralization of the product water is unnecessary.

According to a first aspect, the present invention provides a process for removal of nitrates from water, the process comprising the steps of:
 a. passing a sample of water through a nanofiltration (NF) membrane to obtain a NF permeate and a NF retentate;
 b. passing the NF permeate obtained in step (a) through a reverse osmosis (RO) membrane to obtain an RO permeate and an RO retentate;
 c. combining the NF retentate obtained in step (a) with the RO permeate obtained in step (b) so as to produce product water; and
 d. discarding the RO retentate obtained in step (b); wherein the RO retentate is sufficiently low in brine to be able to be discarded into sewage systems according to local regulations.

In other embodiments, more than one NF membranes are used. In accordance with this embodiment, the process of the invention comprises the steps of:
 a. passing a sample of water through a first NF membrane to obtain a first NF permeate and a first NF retentate;
 b. passing the first NF permeate obtained in step (a) through a second NF membrane to obtain a second NF permeate and a second NF retentate;
 c. combining the first and second NF retentates;
 d. passing the second NF permeate obtained in step (b) through an RO membrane to obtain an RO permeate and an RO retentate;
 e. combining the combined NF retentate obtained in step (c) with the RO permeate obtained in step (d) so as to produce product water; and
 f. discarding the RO retentate obtained step (d); wherein the RO retentate is sufficiently low in brine to be able to be discarded into sewage systems according to local regulations.

In some embodiments, the RO retentate comprises brine having a sodium ($Na^+$) concentration below about 2,000 mg/L and a chloride ($Cl^-$) concentration below about 2,000 mg/L. In other embodiments, the RO retentate comprises brine having a sodium ($Na^+$) concentration below about 1,000 mg/L and a chloride ($Cl^-$) concentration below about 1,000 mg/L. In other embodiments, the RO retentate comprises brine having a sodium ($Na^+$) concentration below about 250 mg/L and a chloride ($Cl^-$) concentration below about 450 mg/L. In other embodiments, the RO retentate comprises brine having a sodium ($Na^+$) concentration below about 230 mg/L and a chloride ($Cl^-$) concentration below about 430 mg/L, which corresponds to the maximum allowed of said ions in waste water according to Israeli regulations. In other currently preferred embodiments, the product water in step (c) has a nitrate concentration below about 16.0 mgN/l, more preferably below about 13.5 mgN/l, which corresponds to the maximum allowed nitrate according to Israeli regulations.

Figure 2:
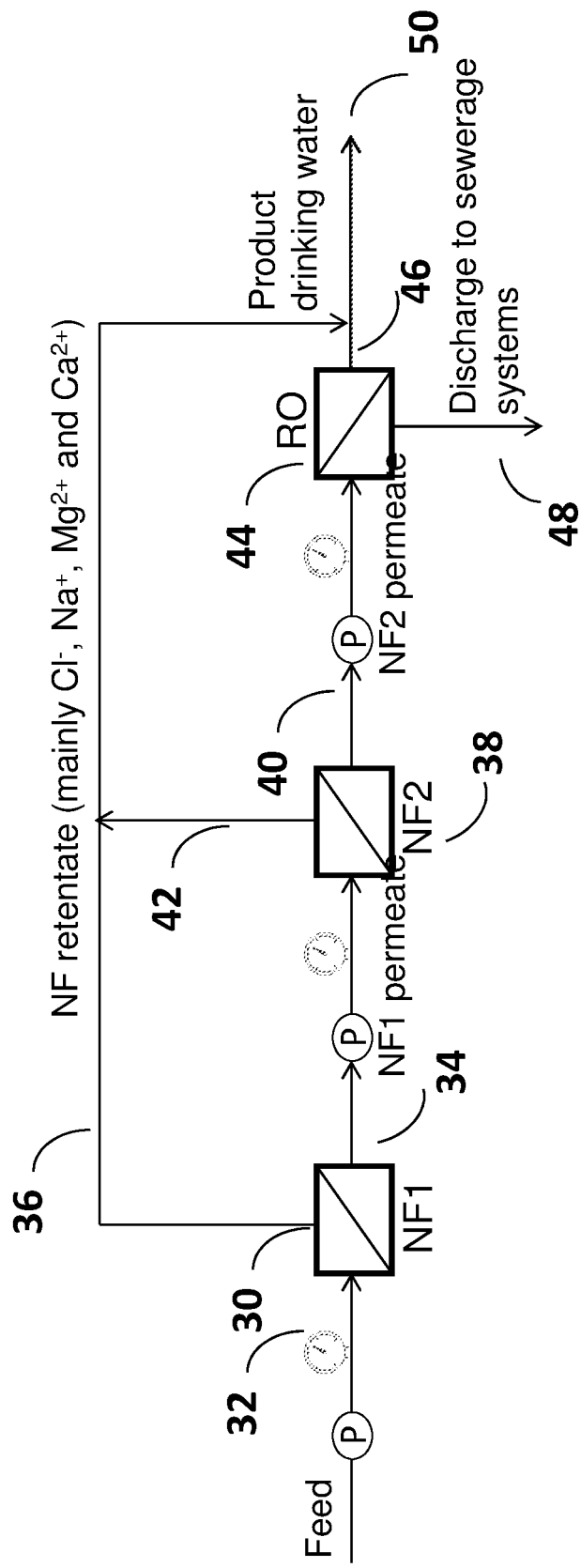
FIG. 2: is a schematic representation of a treatment scheme according to the present invention using a double NF stage.

According to some representative embodiments, suggested single and double NF stage treatment schemes are illustrated schematically in FIGS. 1 and 2, respectively FIG. 1 is a schematic representation of a treatment scheme according to the present invention using a single NF stage. The system includes a NF module comprising a NF membrane 10, an inlet for a feed stream 12 through which source water passes, an outlet for the NF permeate stream 14 and an outlet for the NF retentate stream 16. The system further includes a RO module comprising a RO membrane 18 through which the NF permeate stream passes, an outlet for the RO permeate stream 20 and an outlet for the NF retentate stream 22. The NF retentate stream 16 feeds into the RO permeate stream 20 to create a combined stream 24 of product water that can be used for drinking, irrigation or other purposes. The RO retentate stream 22 is discharged, e.g., to sewage systems. FIG. 1 also demonstrates concentrations of $Cl^-$ and $NO_3^-$—N together with percentages of feed water (Q) and pressures in the different stages of the process. These numbers are based on exemplary feed water characteristics based on Israeli regulations. It is apparent to a person of skill in the art that the system can be adapted to conform to different regulations as desired.

FIG. 2 is a schematic representation of a treatment scheme according to the present invention using a double NF stage. The system includes two sequential NF modules followed by a RO module. The first NF module comprises a first NF membrane (NF1) 30, an inlet for a feed stream 32 through which source water passes, an outlet for the NF1 permeate stream 34 and an outlet for the NF1 retentate stream 36. The system further a second NF module comprising a second NF membrane (NF2) 38 through which the NF1 permeate stream 34 passes, an outlet for the NF2 permeate stream 40 and an outlet for the NF2 retentate stream 42. The system further includes a RO module comprising a RO membrane 44 through which the NF2 permeate stream 40 passes, an outlet for a RO permeate stream 46 and an outlet for a RO retentate stream 48. The NF2 retentate stream 42 feeds into the NF1 retentate stream 36, and the combined NF1 /NF2 retentate stream feeds into the RO permeate stream 46 to create a combined stream 50 of product water that can be used for any of the purposes described above. The RO retentate stream 48 is discharged, e.g., to sewage systems.

Nanofiltration and Reverse Osmosis Membranes

The term "nanofiltration" (NF) as used herein includes any fluid purification technology that uses membranes to impede, but not prevent, the passage of a desired species.

The term "reverse osmosis" (RO) includes any fluid purification technology that produces a fresh water permeate by using an applied pressure to overcome osmotic pressure. Reverse osmosis is a process that is reversed from the naturally occurring process of osmosis. Osmosis occurs when solutions of differing concentrations are separated by a semi-permeable membrane. The osmotic pressure across the membrane is directly proportional to the difference in concentration between the two solutions. To overcome osmosis, pressure must be applied to the more concentrated solution to counteract the natural osmotic pressure being exerted upon it. To reverse the direction of the natural osmotic flow, additional pressure is required.

NF membranes are structurally similar to RO membranes in that chemically they typically are crosslinked aromatic polyamides, which are cast as a thin "skin layer" on top of a microporous polymer sheet support to form a composite membrane structure. The separation properties of the membrane are controlled by the pore size and electrical charge of the "skin layer". Such a membrane structure is usually referred to as a thin film composite (TFC). However, unlike RO membranes, the NF membranes are characterized in having a larger pore size in its "skin layer" and a net negative electrical charge inside the individual pores. This negative charge is responsible for rejection of anionic species, according to the anion surface charge density. Accordingly, divalent anions are more strongly rejected than monovalent ones.

Nanofiltration membranes are well known in the art and any such membranes can be used in the context of the present invention. Examples of nanofiltration membranes are polyamide membranes, especially polypiperazineamide membranes. As examples of useful membranes can be mentioned (i) Desal-5 DL, Desal-5 DK and Desal HL by General Electrics Osmonics Inc.; (ii) NF 270, NF 245 and NF 90 by Dow Chemicals Co.; (iii) NE40 and NE70 by Woongjin Chemicals Co; (iv) Alfa-Laval NF, AlfaLaval NF 10 and Alfa-Laval NF 20 by Alfa-Laval Inc; (v) TriSep TS40 and TS80 by TriSep Co; and (vi) and Hydranautics 84200 ESNA 3J by Nitto Denko Co.

Reverse osmosis membranes are well known in the art and any such membrane can be used in the context of the present invention. Examples of RO membranes include, but are not limited to, UTC-80A (Toray), BW30 (Filmtec Corp.), Espa2 (Hydranautics), TFC ULP (IOCH Membrane Systems), RO1 (Sepro), and the like.

The NF and RO membranes can adopt any shape or configuration. Generally, there are four main types of membrane modules, each of which can be used in the context of the present invention: plate-and-frame, tubular, spiral wound, and hollow fiber. The plate-and-frame module comprises two end plates, the flat sheet membrane, and spacers. In tubular modules, the membrane is often on the inside of a tube, and the feed solution is pumped through the tube. The most popular module in industry for nanofiltration or reverse osmosis membranes is the spiral wound module. This module has a flat sheet membrane wrapped around a perforated permeate collection tube. The feed flows on one side of the membrane. Permeate is collected on the other side of the membrane and spirals in towards the center collection tube. Hollow fiber modules consist of bundles of hollow fibers in a pressure vessel. They can have a shell-side feed configuration where the feed passes along the outside of the fibers and exits the fiber ends. Hollow fiber modules can also be used in a bore-side feed configuration where the feed is circulated through the fibers.

The principles of the invention are demonstrated by means of the following non-limiting examples.

EXAMPLE 1

Experimental Setup

A bench scale nanofiltration system operating in cross-flow mode with a flat sheet membrane cell was used for all membrane tests. The total membrane surface area was 48 $cm^2$. Water was recirculated from the feed tank over the membrane cell with an applied inlet pressure of 8 bars and cross flow rate of 10 L/min. Water temperature was maintained constant at 24° C.. Six different NF membranes were tested: DL and DK (GE Osmonics), NF90, NF245 and NF270 (Dow) and TS80 (Trisep). For each membrane test, permeate and retentate were collected for further analysis throughout the whole process. The final NF recovery ratio was 70%. All experiments were carried out with real groundwater brought from the Zur Moshe well located on the coastal aquifer of Israel. The main groundwater quality parameters are shown in Table 1.

TABLE 1

| Composition of source water | |
|---|---|
| Parameter | Source |
| pH | 7.2 |
| Conductivity [µS/cm] | 774 |

TABLE 1-continued

Composition of source water

| Parameter | Source |
|---|---|
| Alkalinity [mg/L as $CaCO_3$] | 166 |
| $NO_3^-$—N [mg/L] | 20.3 |
| $Cl^-$ [mg/L] | 80.9 |
| $Na^+$ [mg/L] | 45.9 |
| $SO_4^{2-}$ [mg/L] | 14.3 |
| $Ca^{2+}$ [mg/L] | 83.7 |
| $Mg^{2+}$ [mg/L] | 11.5 |

Analyses

Nitrate and chloride were measured using ion chromatography (761 Compact IC, Metrohm). Calcium, magnesium and sodium were measured with ICP-OES spectrometer (iCAP 6000 series, Thermo Fisher Scientific). Conductivity and pH were measured with standard lab conductivity and pH meter (MeterLab). Alkalinity was measured according to Standard Methods (Method 2320). Estimation of precipitation potential of minerals was done using the PHREEQC software (USGS).

Mass Balance for Determining the Adequate Recovery Ratio for each Filtration Stage The selection of the recovery ratio to be applied in each filtration stage is imperative for successful process design. Maximization of product water recovery, minimization of waste brine, minimization of water volume to be treated in further steps (second NF stage, if applied, and RO), salinity of the waste brine, nitrate concentration in the product water and reduction of chemicals dosing—all are affected by the recovery ratio of the different filtration stages. Operating the preliminary NF stage with a minimal recovery ratio can meet most of these goals. NF with a lower recovery ratio produces less saline NF permeate, thus also reducing the salinity of both the RO feed stream and the resulting waste brine. However, operating the NF with a lower recovery ratio produces a higher volume of NF retentate contaminated with nitrate and raises the nitrate concentration in the product water. The RO recovery ratio controls both the total process recovery ratio and the TDS concentration in the final brine. Therefore, optimal recovery ratios in both the NF (first stage NF in the double NF scheme) and RO steps should be pre-determined in order to meet regulations of both product water and waste brine to be discharged to the sewage.

In one embodiment, the NF minimal recovery ratio is about 70% and the RO minimal recovery ratio is about 90%. However, it is apparent to a person of skill in the art that optimal recovery ratios will be determined in each case based on the nature of the source water, the desired use of the product water, the nature of the NF and RO membranes, and any regulatory limitation on the waste water that will be discharged to sewage systems.

The effect of the recovery ratio of the second NF step on the various process considerations (relevant only to the double NF scheme) is less prominent and was thus fixed at 90% during the following preliminary process design calculations.

Equation 1 [15] can be used to asses specific ion concentrations in permeate or retentate of NF for a given recovery ratio.

$$\frac{C_P}{C_F} = \frac{1-(1-Y)^{1-R}}{Y} \quad (1)$$

wherein $C_P$ and $C_F$ are the concentrations of a specific ion in permeate and feed, respectively, R is the local rejection and Y is the corresponding recovery ratio. Eq. 1 was suggested for rough estimations since the osmotic feed pressure does not increase significantly with the increase in recovery in NF processes (for solutions dominated by monovalent ions, namely $Na^+$ and $Cl^-$). Therefore, a constant flux can be roughly assumed for all recoveries and the rejection in the computed segment (i.e. the local rejection R) remains also approximately constant throughout the process. Having said this, validation of the suitability of Eq. 1 for design purposes is needed.

Based on the above considerations (along with technical constraints), a maximal (relatively low) recovery ratio of 70% was selected for the first NF stage. Experimental results (measured concentrations of specific ions in the permeate water at different recoveries) were used for validating Eq. (1). The local rejection (R) was determined by measuring the initial rejection at Y<0.01. In the RO step R was assumed to be 1 for all components. Determination of the final set of operation conditions was carried out based on the calculated results for the NF step. Finally, the recovery ratio of each filtration stage was determined according to the Israeli nitrate drinking water regulations (i.e. maximum of 13.5 mg $NO_3^-$—N/L) and the maximal chloride and sodium ($Na^+$) concentrations in brines discharged to the sewage (430 and 230 mg/L, respectively).

The results presented hereinbelow include the following: a) Results from preliminary experiments aimed at selecting NF membranes with preference to chloride and sodium rejection over nitrate; b) Validation of the mass balance equation based on experimental results using the selected NF membranes at different recovery ratios; c) Application of the mass balance equation for determining the permeate and brine composition as a function of NF recovery ratio at different RO recovery ratios, and selection of the most suitable recovery ratios to meet the Israeli regulations.

EXAMPLE 2

Preliminary NF Membrane Tests

Figure 3:
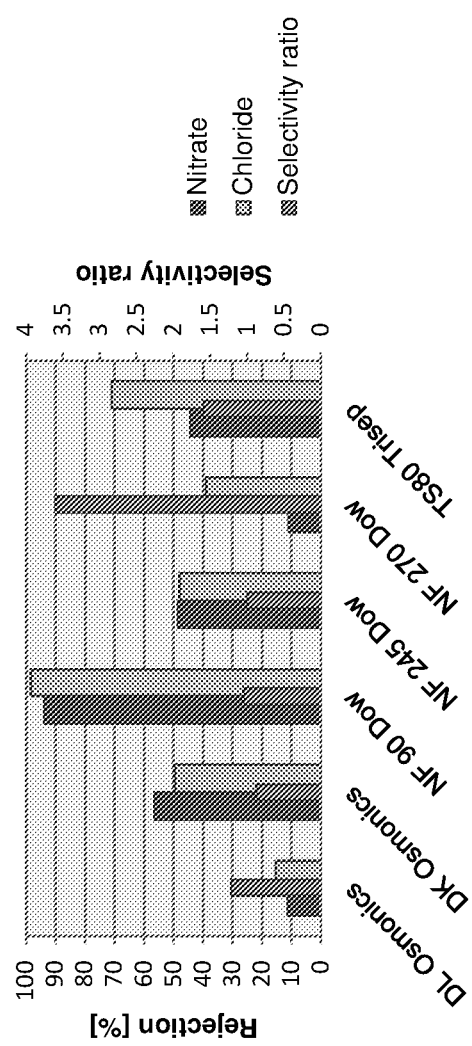
FIG. 3: Final rejections (70% recovery) of nitrate and chloride for different NF membranes and the corresponding chloride rejection: nitrate rejection selectivity ratio.

Six NF membranes were tested in order to assess their selectivity for nitrate and chloride rejection. The results are shown in FIG. 3.

Three of the membranes showed better rejection for chloride. The combination of high chloride rejection with a reasonable selectivity ratio was observed specifically for TS80. Lower rejections of both ions, yet with prominent selectivity for chloride removal, were attained by NF270. Accordingly, it was decided to further evaluate the suitability of TS80 and NF270 for a filtration scheme consisting of single- and double NF stages, respectively.

EXAMPLE 3

Validation of the Mass Balance Equation

Figure 4:
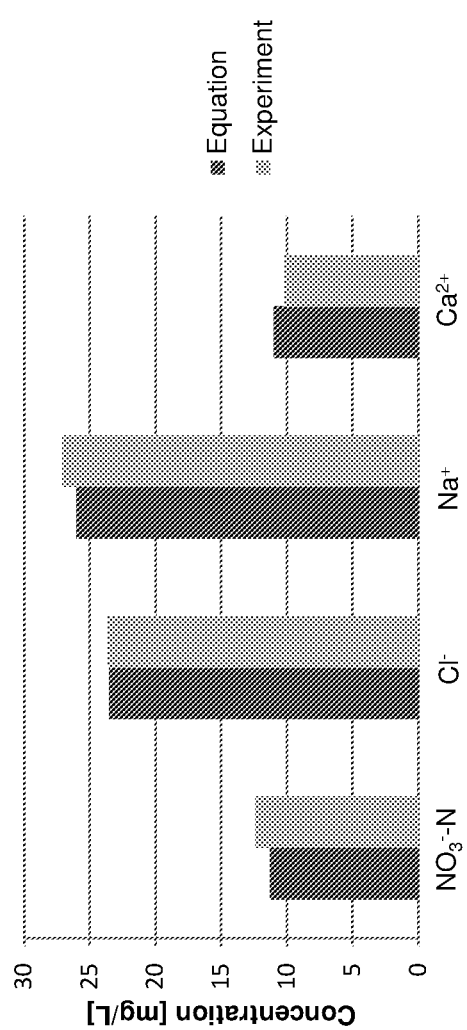
FIG. 4: Comparison between measured and calculated (Eq. 1) ion concentrations of a single NF using the NF membrane TS80.
Figure 5:
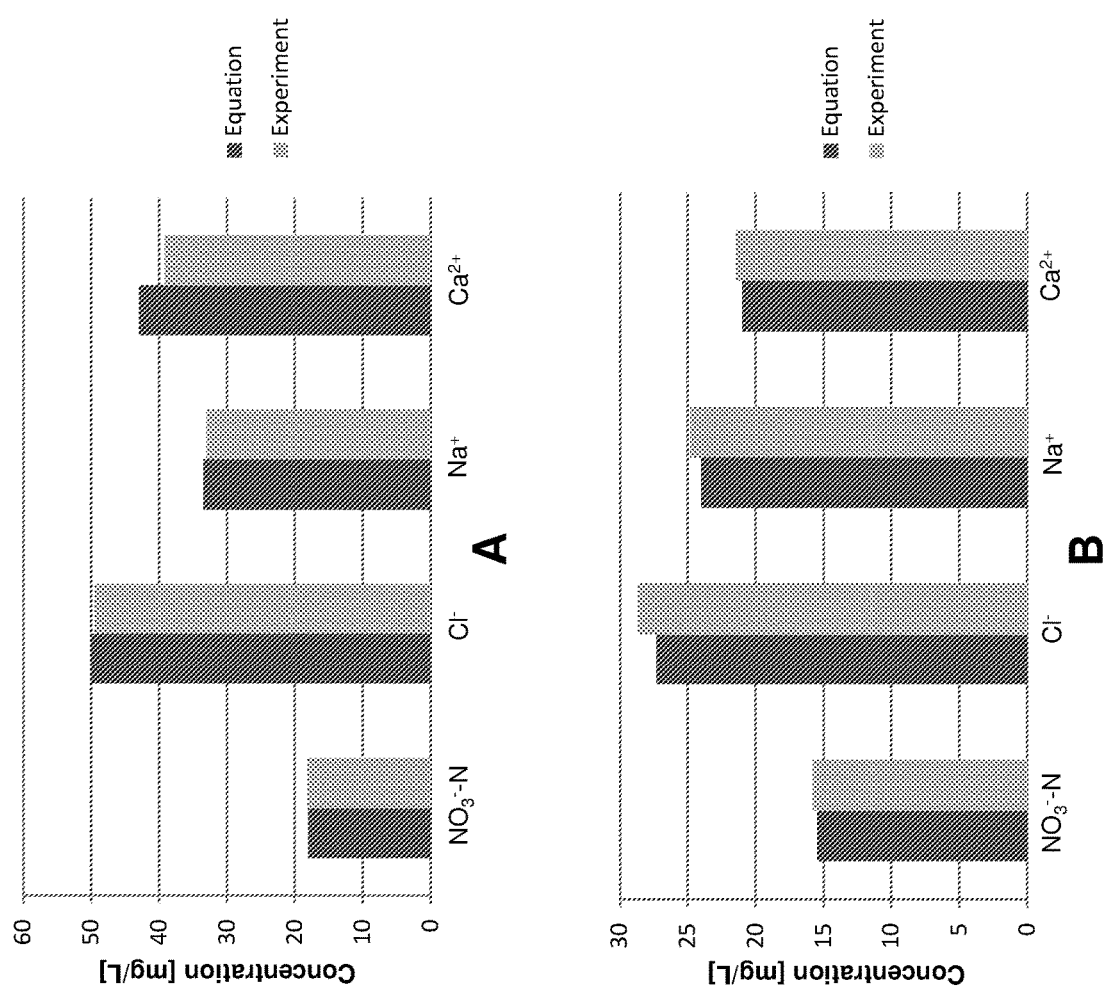
FIG. 5: Comparison between measured and calculated (Eq. 1) ion concentrations for first stage NF filtration (A) and second stage NF filtration (B) using the NF membrane NF270.

The initial (Y≈0.01), middle (Y≈0.35) and final (Y=0.7) permeate concentrations of nitrate, chloride, sodium and calcium for the single and double NF experiments were measured and compared to the calculated concentrations based on Eq. (1). In general, the higher the recovery ratio was, the higher were the deviations between measured and calculated values. Negligible deviations were obtained at Y=0.01 and Y=0.35 (data not shown). FIGS. 4 and 5 (A&B)

present the measured and the calculated ion concentrations at Y=0.7 for the single and double NF experiments, respectively.

The maximal deviation between measured and calculated ion concentrations in the final permeate was lower than 10%. These minor deviations corroborate the use of the Eq. (1) for predicting the ion concentrations throughout the recovery ratio range.

EXAMPLE 4

Determination of the Recovery Ratio at each Stage using Eq. (1)

Concentrations of relevant ions ($NO_3^-$, $Cl^-$, $Na^+$) at different stages of the process as a function of the recovery ratio were assessed using Eq. (1) for both the single- and the double NF filtration scheme. The calculated $NO_3^-$—N concentrations are shown for the product water, while those of $Cl^-$ and $Na^+$ are shown for the waste brine.

(a) Single NF Scheme with TS80

Figure 6:
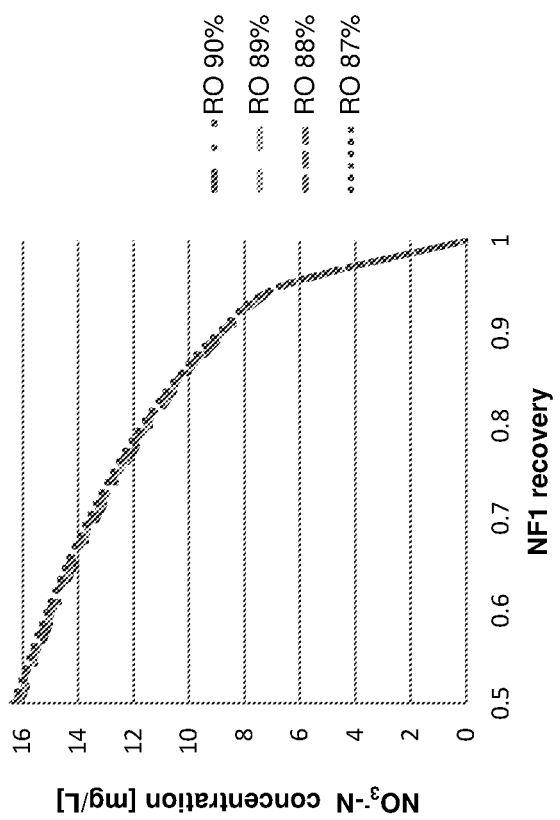
FIG. 6: Nitrate concentration in product water as a function of NF recovery ratio at different RO recovery ratios.

FIG. 6 presents nitrate concentration in the product water as a function of the NF and RO recovery ratios.

At higher NF recoveries, higher volumes of nitrate-rich water are treated in the RO step, resulting in lower nitrate concentration in the product water. The higher the RO recovery, the higher is the dilution of the product water by the nitrate-free RO permeate. As shown in FIG. 6, the minimal recovery that can be applied for NF in order to meet the drinking water standards of 13.5 mg $NO_3^-$—N/L, together with reasonable and high RO recovery, is 69% (correlates with 90% recovery of RO).

Figure 7:
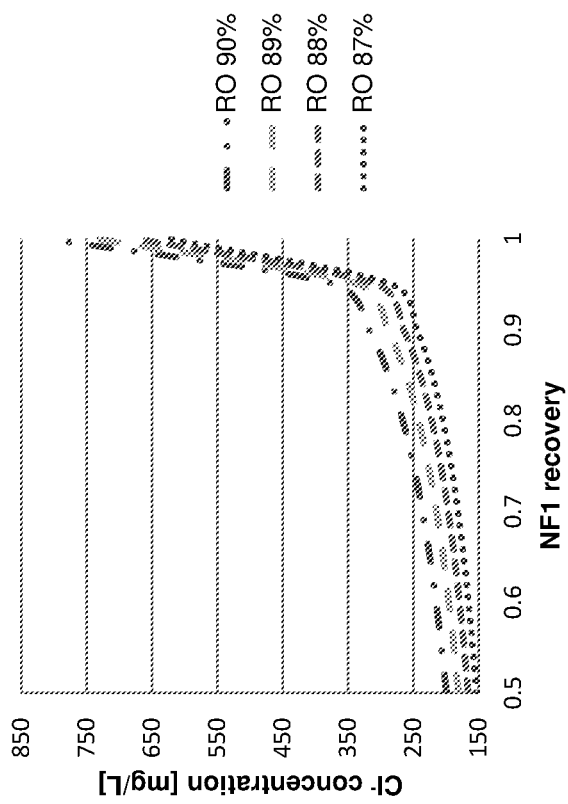
FIG. 7: Chloride (Cl—) concentrations in brine discharged to sewage as a function of NF recovery ratio at different RO recovery ratios.
Figure 8:
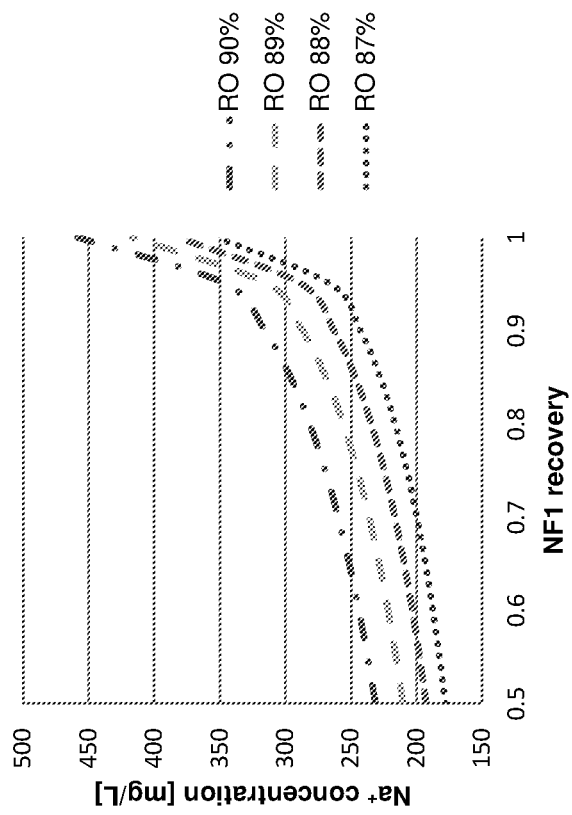
FIG. 8: Sodium ($Na^+$) concentration in brine discharged to the sewage, as a function of NF recovery at different RO recoveries.

FIGS. 7 and 8 present chloride ($Cl^-$) and sodium ($Na^+$) concentrations in the brine discharged to sewage, as a function of the recovery ratio in the NF step at different RO recovery ratios.

Figure 9:
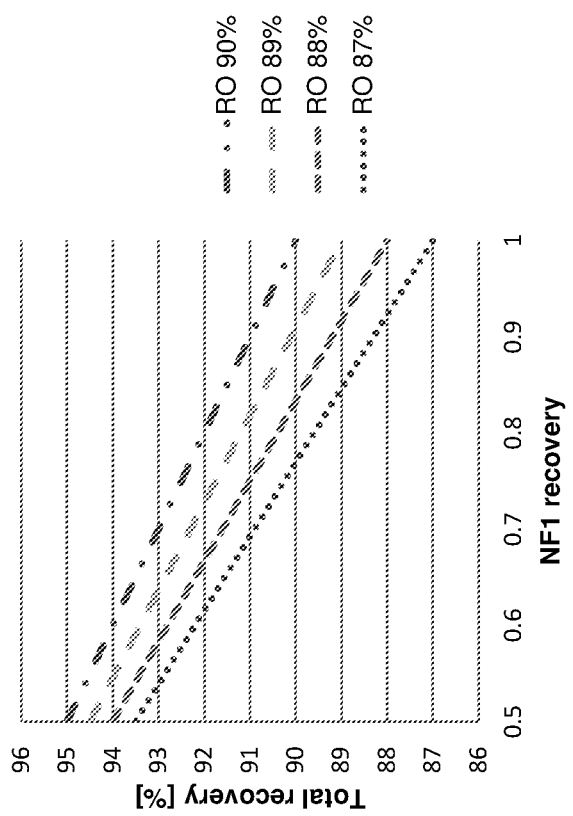
FIG. 9: Total recovery as a function of NF recovery for different RO recoveries.

As expected, operation of NF1 at higher recovery ratios produces RO brine with higher salt concentrations. At higher recovery ratios, the NF permeate is more concentrated, thus raising also the TDS concentration in the feed stream to the RO step and its corresponding brine. The RO recovery ratio affects directly the brine's salinity by a dilution factor. As shown in FIG. 8, the limitation of 230 mg $Na^+$/L for discharge to the sewer limits RO recovery to a maximum of 88%. Higher RO recoveries do not meet this standard under the relevant NF recoveries above 69%. Chloride concentrations are lower than the standard (430 mg $Cl^-$/L) and therefore do not limit the value of RO recovery. However, operation at 88% RO recovery requires a minimal NF recovery of 70% in order to meet product water nitrate concentrations meeting the Israeli standard (FIG. 6). Therefore, recoveries of 70 and 88% for NF and RO, respectively, are adequate for the Israeli regulations, resulting in maximal overall water recovery, minimum water volume to be treated in the RO step and minimum chemical dosing to eliminate scaling. The total recovery ratio obtained with the above recovery ratios is 91.6% (FIG. 9).

(b) Double NF Scheme with NF270

A similar procedure for determining recovery ratios was applied for the double NF scheme using NF270. In general, the trends were similar to those observed in the single NF experiment. However, the lower rejection efficiencies of the NF270 membrane led to less concentrated NF1 retentate and more concentrated NF1 permeate at a given recovery. Therefore, the concentration of nitrate in the product water decreased, the level of both chloride and sodium in the waste brine increased and the recovery of NF1 had, thus, to be reduced.

The adequate recoveries for the Israeli regulations were 53, 90 and 88% for NF1, NF2 and RO, respectively. Calculated nitrate-N concentration in product and chloride and sodium concentrations in waste brine with the above recoveries were 13.5, 257 and 216 mg/L, respectively. The total recovery was 94.3%.

EXAMPLE 5

Calcium Carbonate Precipitation and Prevention Options

Figure 10:
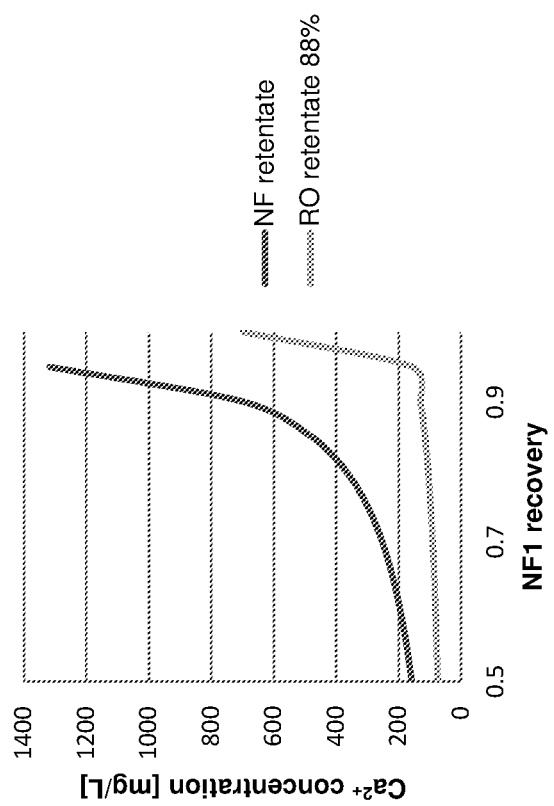
FIG. 10: Calcium concentration in the retentates of the NF and the RO (at 88% recovery) stages as a function of NF recovery, for the single NF scheme.
Figure 11:
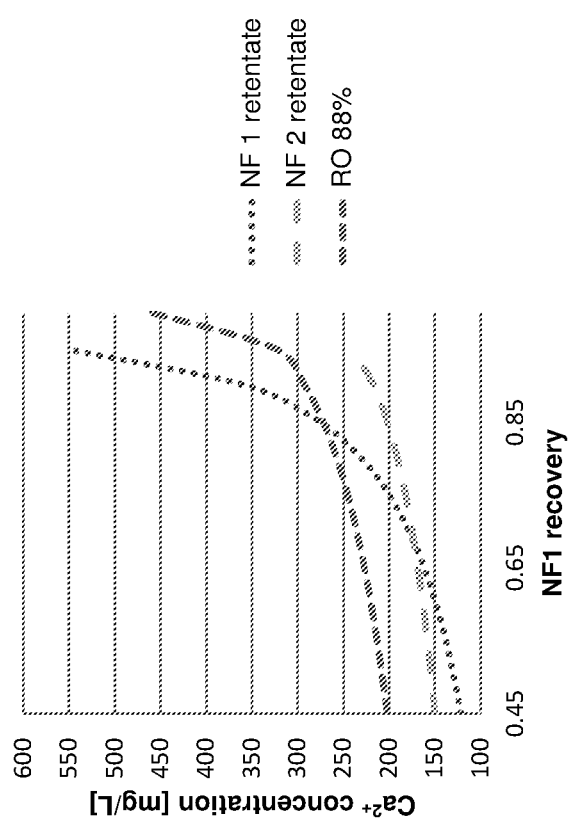
FIG. 11: Calcium concentration in the retentates of NF1, NF2 and RO (at 88% recovery) stages as a function of NF1 recovery, for the double NF scheme.

Calcium carbonate precipitation can occur at the different stages of the process. Magnesium and sulfate concentrations were too low for inducing precipitation (Table 1). FIG. 10 presents the calcium concentration in the NF and RO retentates as a function of the NF recovery for the single NF scheme. FIG. 11 presents calcium concentration in the retentate of both NF and RO stages as a function of the recovery of the NF1 for the double NF scheme. RO recovery was set at 88% as found to be an optimum in the previous sections for both filtration schemes.

In general, the calcium concentration in the retentate of NF1 depends positively on the recovery of NF1 due to a dilution factor. The calcium concentration in the retentate of NF2 and RO depends also positively on NF1's recovery due to the formation of higher concentrated permeates at the higher NF recoveries. Each permeate serves as the feed stream for the next filtration stage, thus also affecting positively the corresponding retentate of the specific stage. At the relevant NF1 recovery range determined in the previous section (i.e. 50-70%), the highest precipitation potential was calculated in RO retentate for the double NF scheme with the corresponding assessed parameters of pH 8.14, alkalinity 250 mg/L (as calcium carbonate) and calcium 213 mg/L. For this case, the $CaCO_3$ precipitation potential calculated was 56 mg/L. The scaling potential can be minimized by the addition of a small amount of antiscalant. Due to the difficulty of the addition of antiscalants to drinking water, a similar effect can be achieved by lowering source water pH from 7.2 to 6.7 by the addition of 0.5mM HCl or 0.25 mM $H_2SO_4$. The addition of chlorides or sulfates in the process is negligible. Similar acid concentration is required in the single NF scheme.

EXAMPLE 6

Comparison of Energy Requirements in Different Filtration Schemes

Table 2 presents rough estimations of energy consumption and energy cost for the 3 treatment alternatives: RO, single NF followed by RO and double NF followed by RO. Recoveries and pressures for the combined NF-RO schemes are based on the calculations above. In the case of RO as a sole treatment, recovery and pressure were chosen so that the process will meet the local Israeli standards for drinking water and wastewater.

TABLE 2

Estimations of energy consumption and energy cost for the 3 treatment alternatives based on membrane filtration

| | | Treatment scheme | | | | |
|---|---|---|---|---|---|---|
| | RO | Single NF + RO | | Double NF + RO | | |
| Stage | RO | NF | RO | NF1 | NF2 | RO |
| Stage Recoveries [%] | 80 | 70 | 88 | 53 | 90 | 88 |
| Total recovery [%] | 80 | 91.6 | | 94.3 | | |
| Pressure [bar] | 10 | 8 | 8 | 8 | 8 | 8 |
| Energy consumption [kWh/m$^3$ product] | 0.46 | 0.55 | | 0.63 | | |
| Energy cost [cent/m$^3$ product] | 2.76 | 3.3 | | 3.78 | | |

Each NF stage increases the energy cost by approximately 0.5 cent/m$^3$ product water. However, the addition of single and double NF stage increases significantly the total recovery and minimizes waste brine volume by a factor higher than 2 and 3, respectively, on top of much lower brine salinity.

Conclusions:

A novel and cost effective filtration scheme for removal of nitrate from groundwater, characterized by production of low salinity waste brine that can be easily discharged to sewerage systems and high product-water recovery, is demonstrated herein. The system comprises a NF step followed by RO filtration. Several nanofiltration membranes have shown their effectiveness for preferable removal of chloride and sodium over nitrate. This selectivity is utilized herein to separate nitrate from other ions in a preliminary groundwater filtration stage. The nitrate-rich NF permeate is then filtrated by RO in a following stage to produce a salt-free permeate together with a waste brine with low salinity. The concentrate (retentate) removed by the NF is mixed again with the RO permeate thus allowing for high water recovery ratio and making remineralization of product water unnecessary. Moreover, the NF stage reduces the amount of water needed to be treated by RO and minimize scaling potential on the RO membrane. Two representative schemes for treating nitrate-contaminated groundwater with brine discharge to sewer are presented herein. High total recoveries of 91.6 and 94.3% can be achieved for the single and double NF scheme, respectively. CaCO$_3$ precipitation potential is low for both cases and can be removed completely by reasonable acid dosing.

The suggested scheme is based on a "fit to purpose" concept that links the quality of the treated water, the applied technology and the alternative destinations for waste brine such as direct disposal to the sewage, denitrification followed by disposal to the sewage or irrigation. The examples hereinabove describe a specific treatment scheme for nitrate-contaminated groundwater with direct brine discharge to the sewage based on local regulations in Israel. However, it is apparent to a person of skill in the art that the principles of the present invention can be easily applied to other demands.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

REFERENCES

[1] V. Mat, J. Krej, and T. Janoch, Biological water denitrification - A review, Enzyme microbe. technol. 14 (1992) 170-183.

[2] M. O. Rivett, S. R. Buss, P. Morgan, J. W. N. Smith, and C. D. Bemment, Nitrate attenuation in groundwater: A review of biogeochemical controlling processes, Water Res. 42 (2008) 4215-4232.

[3] M. Green, S. Tarre, M. Schnizer, B. Bogdan, R. Armon, and G. Shelef, Groundwater denitrification using an upflow sludge blanket reactor, Water Res. 28 (1994) 631-637.

[4] B. Van Der Bruggen and C. Vandecasteele, Removal of pollutants from surface water and groundwater by nanofiltration: overview of possible applications in the drinking water industry, Environ. Pollut. 122 (2003) 435-445.

[5] D. X. Wang, M. Su, Z. Y. Yu, X. L. Wang, M. Ando, and T. Shintani, Separation performance of a nanofiltration membrane influenced by species and concentration of ions, Desalination 175 (2005) 219-225.

[6] M. A. Amouha, G. R. N. Bidhendi, and B. Hooshyari, Nanofiltration Efficiency in Nitrate Removal from Groundwater: A Semi-Industrial Case Study, in 2nd International Conference on Environmental Engineering and Applications, 2011.

[7] C. K. Diawara, L. Paugam, M. Pontié, J. P. Schlumpf, P. Jaouen, and F. Quéméneur, Influence of chloride, nitrate, and sulphate on the removal of fluoride ions by using nanofiltration membranes, Separ. Sci. Technol. 40 (2005) 3339-3347.

[8] A. Santafé-Moros, J. M. Gozálvez-Zafrilla, and J. Lora-García, Nitrate removal from ternary ionic solutions by a tight nanofiltration membrane, Desalination 204 (2007) 63-71.

[9] F. Garcia, D. Ciceron, A. Saboni, and S. Alexandrova, Nitrate ions elimination from drinking water by nanofiltration: Membrane choice, Separ. Purif. Technol. 52 (2006) 196-200.

[10] A. S. Moros, J. M. Goza, Lvez-Zafrilla, and J. Lora-Garcia, Performance of commercial nanofiltration membranes in the removal of nitrate ions, Desalination 185 (2005) 281-287.

[11] J. Bohdziewicz, M. Bodzek, and E. Wqsik, The application of reverse osmosis and nanofiltration to the removal of nitrates from groundwater, Desalination 121 (1998) 139-147.

[12] K. Hayrynena, E. Pongracza, V. Vaisanena, N. Papa, M. Manttaric, J. Langwaldtd, and R. L. Keiskia, Concentration of ammonium and nitrate from mine water by reverse osmosis and nanofiltration, Desalination 240 (2009) 280-289.

[13] L. A. Richards, M. Vuachère, and A. I. Schäfer, Impact of pH on the removal of fluoride, nitrate and boron by nanofiltration/reverse osmosis, Desalination 261 (2010) 331-337.

[14] B. Van Der Bruggen and J. Geens, "Nanofiltration," in Advanced Membrane Technology and Applications, 2008, pp. 271-295.

[15] Mulder, Basic Principles of Membrane Technology, second ed., Springer, 1996, pp. 489-490.

[16] Rauternbach, R. and Gröschl, A. Separation potential of nanofiltration membranes., Desalination, 77 (1990), 73-84.

What is claimed is:

1. A process for removal of nitrates from water, to produce (i) product water and (ii) a waste brine comprising sodium ($Na^+$) concentration below about 250 mg/L and a chloride ($Cl^-$) concentration below about 450 mg/, the process comprising the steps of:
   a. passing a sample of water through a nanofiltration (NF) membrane to obtain a NF permeate and a NF retentate;
   b. passing the NF permeate obtained in step (a) through a reverse osmosis (RO) membrane to obtain an RO permeate and an RO retentate;
   wherein steps (a) and (b) further comprise controlling NF and RO recovery ratios to result in RO retentate comprising waste brine having sodium ($Na^+$) concentration below about 250 mg/L and a chloride ($Cl^-$) concentration below about 450 mg/L;
   c. combining the NF retentate obtained in step (a) with the RO permeate obtained in step (b) so as to produce product water; and
   d. discarding the RO retentate obtained in step (b).

2. The process according to claim 1, further comprising a step of passing the NF permeate obtained in step (a) through at least one additional NF membrane prior to performing step (b).

3. The process according to claim 2, wherein the NF retentates resulting from each NF step are combined.

4. The process according to claim 3, wherein the combined NF retentates are mixed with the RO permeate.

5. The process according to claim 2, comprising the steps of:
   a. passing a sample of water through a first NF membrane to obtain a first NF permeate and a first NF retentate;
   b. passing the first NF permeate obtained in step (a) through a second NF membrane to obtain a second NF permeate and a second NF retentate;
   c. combining the first and second NF retentates;
   d. passing the second NF permeate obtained in step (b) through an RO membrane to obtain an RO permeate and an RO retentate;
   wherein steps (a) - (d) further comprise controlling NF and RO recovery ratios to result in RO retentate comprising waste brine having sodium ($Na^+$) concentration below about 250 mg/L and a chloride ($Cl^-$) concentration below about 450 mg/L;
   e. combining the combined NF retentate obtained in step (c) with the RO permeate obtained in step (d) so as to produce product water; and
   f. discarding the RO retentate obtained step (d).

6. The process according to claim 1, wherein the NF membrane preferentially rejects $Na^+$, $Cl^-$, $Ca^{+2}$ and/or $Mg^{2+}$ ions over $NO_3^-$ ions.

7. The process according to claim 1, wherein the NF membrane rejects divalent ions selected from $Ca^{+2}$ and $Mg^{+2}$ thereby preventing precipitation of said ions in the RO stage.

8. The process according to claim 1, wherein the product water in step (c) has a nitrate concentration below about 16.0 mgN/l.

9. The process according to claim 8, wherein the product water in step (c) has a nitrate concentration below about 13.5 mgN/l.

10. The process according to claim 1, wherein the brine has a sodium ($Na^+$) concentration below about 230 mg/L and a chloride ($Cl^-$) concentration below about 430 mg/L.

11. The process according to claim 1, wherein the NF recovery ratio is about 70% or higher.

12. The process according to claim 1, wherein the RO recovery ratio is about 90% or higher.

* * * * *